US012731572B2

(12) United States Patent
Matsubara et al.

(10) Patent No.: US 12,731,572 B2
(45) Date of Patent: Sep. 8, 2026

(54) INTERACTION SERVICE PROVIDING SYSTEM, INFORMATION PROCESSING APPARATUS, INTERACTION SERVICE PROVIDING METHOD, AND RECORDING MEDIUM

(71) Applicants: Mayumi Matsubara, Tokyo (JP); Shintaro Kawamura, Kanagawa (JP)

(72) Inventors: Mayumi Matsubara, Tokyo (JP); Shintaro Kawamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 164 days.

(21) Appl. No.: 18/519,042

(22) Filed: Nov. 26, 2023

(65) Prior Publication Data

US 2024/0177704 A1 May 30, 2024

(30) Foreign Application Priority Data

Nov. 28, 2022 (JP) ................................ 2022-189556
Oct. 25, 2023 (JP) ................................ 2023-183240

(51) Int. Cl.
*G10L 13/02* (2013.01)
*H04L 67/306* (2022.01)

(52) U.S. Cl.
CPC ............ *G10L 13/02* (2013.01); *H04L 67/306* (2013.01)

(58) Field of Classification Search
CPC .............................. G10L 13/02; H04L 67/306
See application file for complete search history.

(56) References Cited

U.S. PATENT DOCUMENTS 5,937,381 A * 8/1999 Huang .................... G10L 17/24 704/214
6,073,101 A * 6/2000 Maes .................... G10L 15/065 704/E17.011
11,146,847 B1 * 10/2021 Harshawat ......... H04N 21/4314
12,314,678 B2 * 5/2025 Asai ........................ G10L 15/22
(Continued)

FOREIGN PATENT DOCUMENTS

JP 2017-062741 3/2017
JP 2021-193469 12/2021

*Primary Examiner* — Fariba Sirjani
(74) *Attorney, Agent, or Firm* — XSENSUS LLP

(57) ABSTRACT

An interaction service providing system includes a terminal device operated by a user; and an information processing apparatus configured to communicate with the terminal device. The information processing apparatus includes first circuitry; and a first memory storing computer-executable instructions that cause the first circuitry to execute communicating with the terminal device to receive, from the terminal device, input information that is input by the user; reading history information of an existing user; determining a characteristic of the user based on the input information and the history information; and generating speech information to be presented to the user, based on the characteristic of the user. The communicating includes transmitting the speech information to the terminal device. The terminal device includes second circuitry; and a second memory storing computer-executable instructions that cause the first circuitry to execute displaying the speech information received from the information processing apparatus.

20 Claims, 13 Drawing Sheets

(56) References Cited

U.S. PATENT DOCUMENTS

| | | | | |
|---|---|---|---|---|
| 2003/0182119 | A1* | 9/2003 | Junqua | G10L 15/24<br>704/E15.041 |
| 2013/0080162 | A1* | 3/2013 | Chang | G10L 15/34<br>704/235 |
| 2017/0091846 | A1* | 3/2017 | Henmi | G06F 16/9535 |
| 2018/0239495 | A1* | 8/2018 | Sharifi | G06F 40/295 |
| 2019/0147889 | A1* | 5/2019 | Cheng | G10L 17/22<br>704/246 |
| 2019/0206409 | A1* | 7/2019 | Jung | G10L 17/00 |
| 2020/0320995 | A1* | 10/2020 | Min | G06F 21/32 |
| 2021/0134302 | A1* | 5/2021 | Kwon | G10L 25/51 |
| 2021/0319361 | A1* | 10/2021 | Miyajima | G06F 16/2379 |
| 2024/0152588 | A1* | 5/2024 | Patten | G06Q 30/0601 |
| 2024/0177704 | A1* | 5/2024 | Matsubara | G10L 13/02 |

* cited by examiner 2,3
HD
504
CPU
501
ROM
502
RAM
503
HDD CONTROLLER
505
DISPLAY
506
EXTERNAL DEVICE CON-NECTION I/F
508
510
NETWORK I/F
509
KEYBOARD
511
POINTING DEVICE
512
DVD-RW DRIVE
514
MEDIUM I/F
516
SOUND INPUT/OUTPUT I/F
519
MICRO-PHONE
517
SPEAKER
518
513
RECORD-ING MEDIUM
515

START
S50
RECEIVE INTERACTION START REQUEST
S51
READ USER INFORMATION AND HISTORY INFORMATION
S52
IS USER INFORMATION INSUFFICIENT?
NO
YES
S53
TRANSMIT MESSAGE
S54
IS THERE RESPONSE FROM USER?
NO
YES
S55
DETERMINE USER GROUP
S56
GENERATE OR UPDATE USER INFORMATION
S57
GENERATE AND TRANSMIT MESSAGE ACCORDING TO CHARACTERISTIC OF USER
END

| USER IDENTIFIER (101) | USER NAME (102) | USER GROUP (103) |
|---|---|---|
| 001 | USER A | 1 |
| 002 | USER B | 2 |
| 003 | NEW USER | 2 |
| : | : | : |

START
S60
SET INITIAL VALUE
OF USER GROUP (i=1)
S61
IS i≤M SATISFIED?
NO
YES
S62
GENERATE Y'i
S63
CALCULATE SIMILARITY
Si BETWEEN Y'i AND Yq
S64
UPDATE i (i=i+1)
S65
DETERMINE USER GROUP
END

Greeting & Topic

THANK YOU FOR YOUR HARD WORK. MR. <UserName>.
IS THERE ANYTHING I CAN HELP YOU WITH?

Response To Request

```
if userGroup = 1 then YOU WOULD LIKE TO DO <Select>. CERTAINLY.
if userGroup = 2 then <iceBreak>.
                      YOU WOULD LIKE TO DO <Select>. CERTAINLY.
⋮
else YOU WOULD LIKE TO DO <Select>. CERTAINLY.
end if
```

Figure 11:
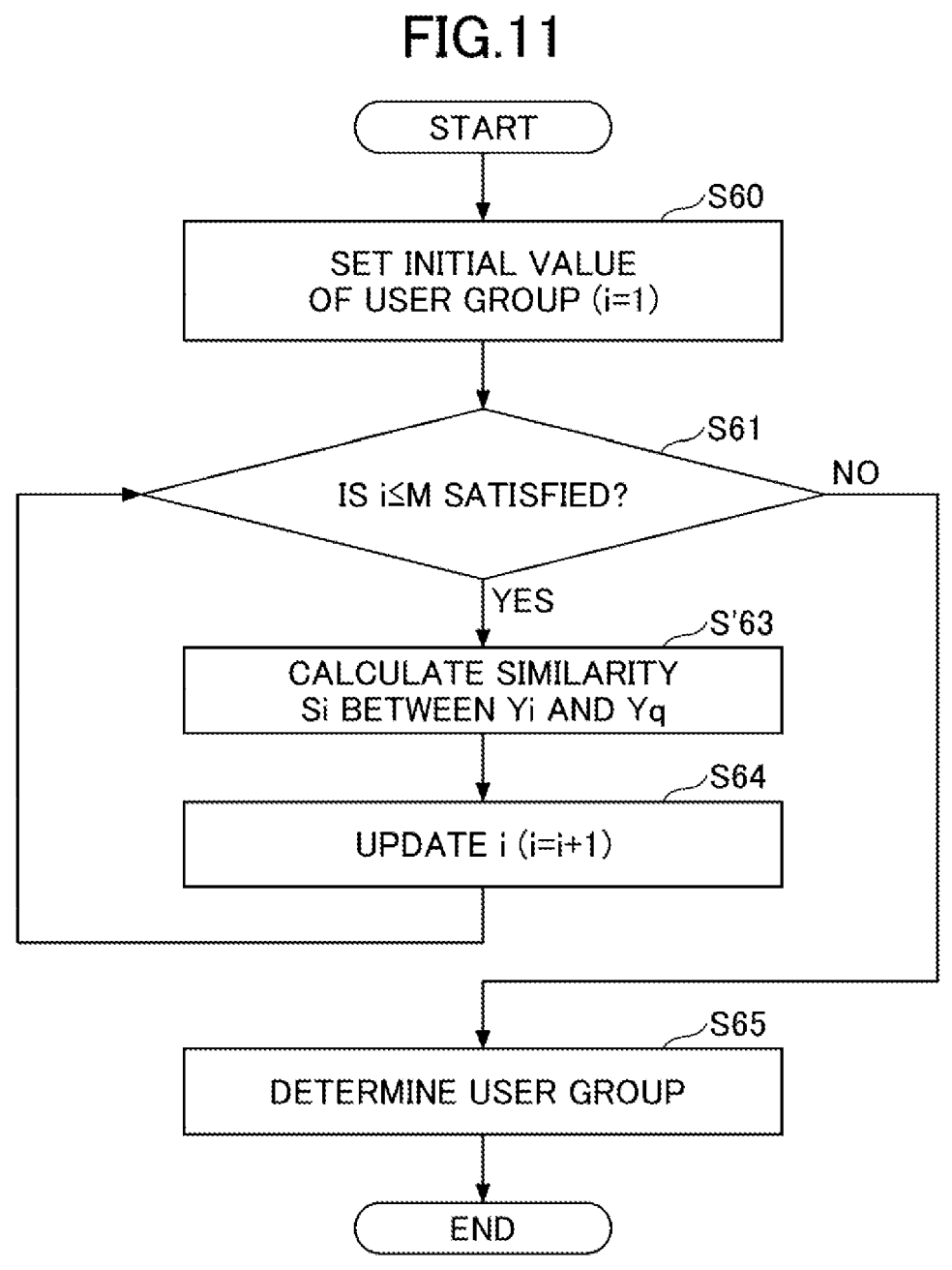

START
S60
SET INITIAL VALUE OF USER GROUP (i=1)
S61
IS i≤M SATISFIED?
NO
YES
S'63
CALCULATE SIMILARITY Si BETWEEN Yi AND Yq
S64
UPDATE i (i=i+1)
S65
DETERMINE USER GROUP
END

| HISTORY IDENTIFIER (121) | TRANSMITTED MESSAGE (122) | RESPONSE MESSAGE (123) | USER IDENTIFIER (124) |
|---|---|---|---|
| 001 | Greeting & Topic<br>"THANK YOU FOR YOUR HARD WORK.<br>MR. USER A.<br>IS THERE ANYTHING I CAN HELP YOU WITH?" | "I WANT TO DO A." | 001 |
| 002 | Greeting & Topic<br>"THANK YOU FOR YOUR HARD WORK.<br>MR. USER B.<br>IS THERE ANYTHING I CAN HELP YOU WITH?" | "I WANT TO DO A.<br>I AM SO BUSY TODAY THAT<br>I FEEL DIZZY." | 002 |
| 003 | Response to Request<br>"YOU WOULD LIKE TO DO A. CERTAINLY." | "○○○・・・・・・・" | 001 |
| 004 | Response to Request<br>"THE END OF THE MONTH IS<br>PARTICULARLY BUSY…<br>YOU WOULD LIKE TO DO A. CERTAINLY." | "△△△・・・・・・・" | 002 |
| : | : | : | : |

FIG.13

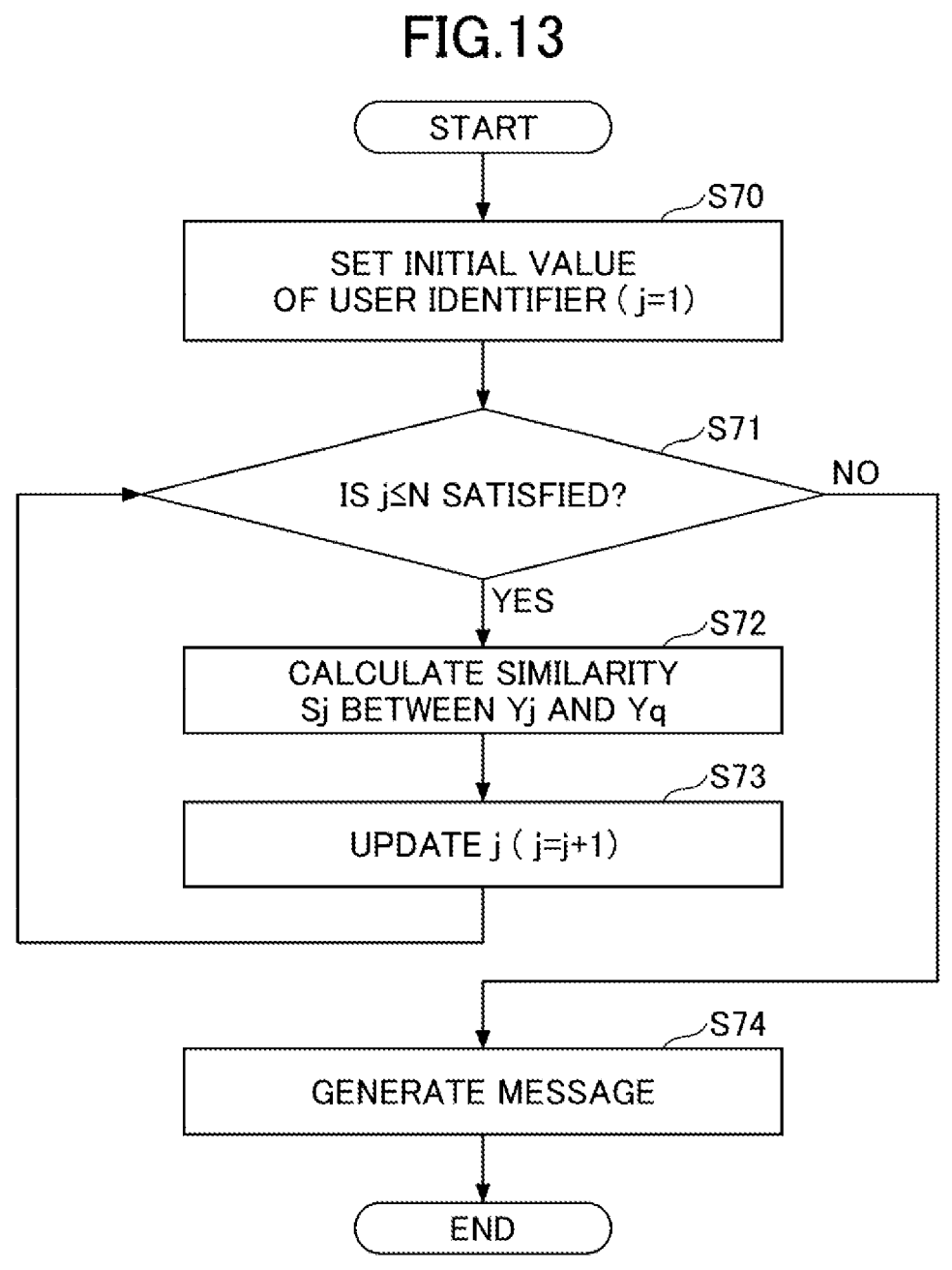

START

S70

SET INITIAL VALUE OF USER IDENTIFIER ( j=1)

S71

IS j≤N SATISFIED?

NO

YES

S72

CALCULATE SIMILARITY Sj BETWEEN Yj AND Yq

S73

UPDATE j ( j=j+1)

S74

GENERATE MESSAGE

END

INTERACTION SERVICE PROVIDING SYSTEM, INFORMATION PROCESSING APPARATUS, INTERACTION SERVICE PROVIDING METHOD, AND RECORDING MEDIUM

CROSS-REFERENCE TO RELATED APPLICATION

The present application is based on and claims priority under 35 U.S.C. § 119 to Japanese Patent Application No. 2022-189556, filed on Nov. 28, 2022 and Japanese Patent Application No. 2023-183240, filed on Oct. 25, 2023, the contents of which are incorporated herein by reference in their entirety.

BACKGROUND OF THE INVENTION

1. Field of the Invention

The present invention relates to an interaction service providing system, an information processing apparatus, an interaction service providing method, and a recording medium.

2. Description of the Related Art

As an interaction service, for example, there is already known a technology of an interaction system in which the system and the user interact with each other regarding questions from the user and operations of various devices in order to achieve predetermined tasks. Patent Document 1 discloses a technology for selecting an agent candidate to be a base for a new user using the interaction service, according to attributes or characteristics of the user input by the new user.

Patent Document 1: Japanese Unexamined Patent Application Publication No. 2021-193469

SUMMARY OF THE INVENTION

According to one aspect of the present invention, there is provided an interaction service providing system including a terminal device operated by a user; and an information processing apparatus configured to communicate with the terminal device, wherein the information processing apparatus includes first circuitry; and a first memory storing computer-executable instructions that cause the first circuitry to execute communicating with the terminal device to receive, from the terminal device, input information that is input by the user; reading history information of an existing user; determining a characteristic of the user based on the input information and the history information; and generating speech information to be presented to the user, based on the characteristic of the user, wherein the communicating includes transmitting the speech information to the terminal device, and wherein the terminal device includes second circuitry; and a second memory storing computer-executable instructions that cause the first circuitry to execute displaying the speech information received from the information processing apparatus.

BRIEF DESCRIPTION OF THE DRAWINGS

FIG. 5 is a diagram illustrating an example of user information according to an embodiment of the present invention;

FIGS. 9A and 9B are diagrams for explaining message generation processing according to the characteristic of a user according to an embodiment of the present invention;

FIG. 11 is a diagram illustrating an example of a flowchart of user group determination processing (modified example 1) according to an embodiment of the present invention;

FIG. 12 is a diagram illustrating an example of interaction history according to an embodiment of the present invention;

FIG. 13 is a diagram illustrating an example of a flowchart of message generation processing (modified example 2) according to an embodiment of the present invention.

DESCRIPTION OF THE EMBODIMENTS

In the conventional technology, in order to provide a new user with an interaction service according to the characteristics of the user, it has been necessary to have the new user input the attribute information of the user in order to accurately determine the characteristics of the user. In particular, it is a burdensome task for a new user who wants to casually use the interaction service, to input the attribute information of the user instructed by the system at the start of using the service. Further, when the attribute information of the user cannot be sufficiently obtained, the information may be insufficient for providing the interaction service according to the characteristics of the user.

A problem to be addressed by an embodiment of the present invention is to provide an interaction service according to the characteristics of the user without forcing the user to input the attribute information indicating the characteristics of the user.

Hereinafter, an interaction service providing system, an information processing apparatus, an interaction service providing method, and a program according to an embodiment of the present invention will be described in detail with reference to the attached drawings.

First Embodiment

<System Overview>

Figure 1:
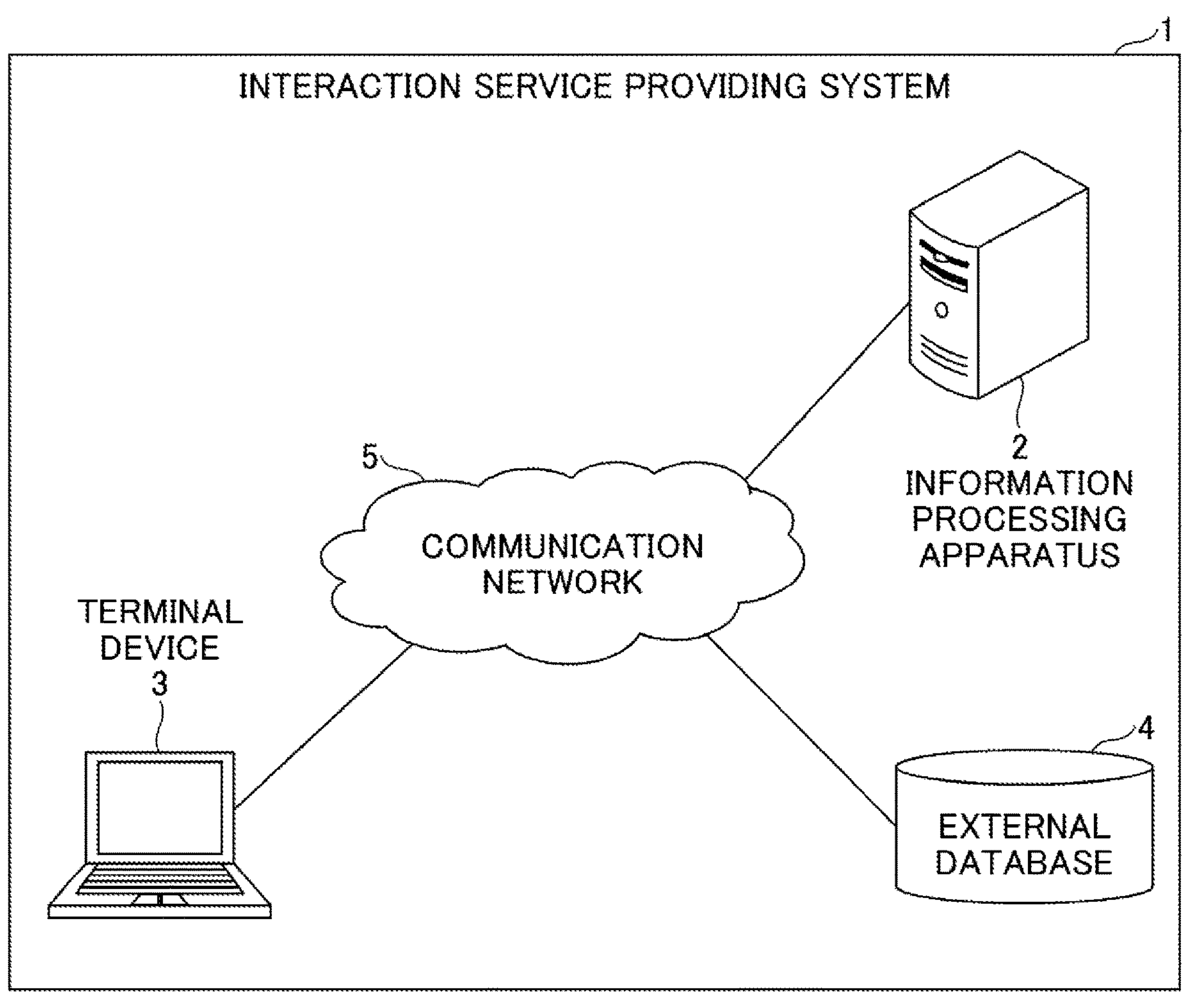
FIG. 1 illustrates an example of a schematic diagram of an interaction service providing system according to an embodiment of the present invention.

FIG. 1 is a diagram illustrating an example of a schematic diagram of an interaction service providing system according to an embodiment of the present invention. An interaction service providing system 1 includes, for example, an information processing apparatus 2, an external database 4, and a terminal device 3 connected to a communication network 5 such as the Internet.

The information processing apparatus 2 transmits speech information (which may be referred to as a message) in an interaction service to the terminal device 3 operated by a user, and receives speech information input by the user from the terminal device 3.

The external database 4 stores user information (for example, an identifier identifying the user, the user group to which the user belongs, etc.) and interaction history (which may be referred to as history information) used in the interaction service. However, the information processing apparatus 2 may store part or all of the user information and the interaction history in a storage device of the information processing apparatus 2.

The terminal device 3 may be, for example, a laptop computer, a smartphone, and a tablet terminal used by the user of the interaction service. The terminal device 3 transmits, to the information processing apparatus 2, speech information in the interaction input by the user, and displays, on the screen of the terminal device 3, the speech information received from the information processing apparatus 2. The means by which the user inputs speech information to the terminal device 3 may be character input from a keyboard or a touch panel, or may be voice input from a microphone.

In the interaction service providing system 1, the information processing apparatus 2 can, for example, generate speech information corresponding to the characteristics of a new user by determining the characteristics of the new user based on the information input by the new user in the interaction, the user information of an existing user, and the interaction history, and transmit the generated speech information to the terminal device 3. That is, the interaction service providing system 1 can provide an interaction service according to the characteristics of the new user without forcing the new user to input attribute information (for example, gender, age, department, hobby, etc.) indicating the characteristics of the user. Further, the information processing apparatus 2 may use a natural sentence input by the user (the new user and the existing user) for the purpose of, for example, a report, when determining the characteristics of the new user. The natural sentence input by the user may be stored in the interaction history or may be stored separately from the interaction history.

The system configuration of the interaction service providing system 1 illustrated in FIG. 1 is an example. For example, the communication network 5 may include a connection section according to wireless communication such as mobile communication, wireless LAN, or the like. The number of information processing apparatuses 2 and terminal devices 3 may be any number. The functions and means provided by the information processing apparatuses 2 and the external database 4 may be provided by services existing on a cloud network.

<Example of Hardware Configuration>

Figure 2:
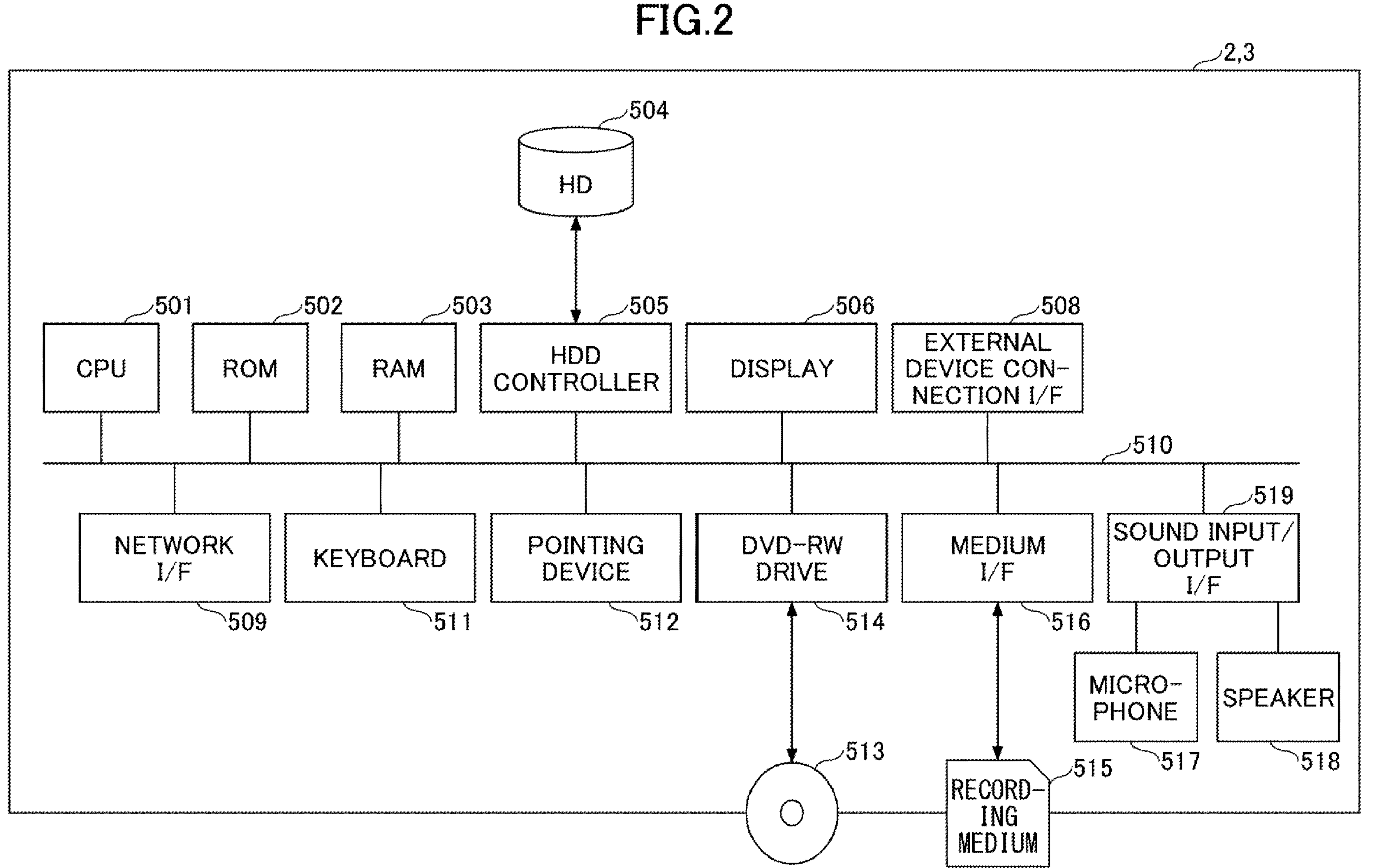
FIG. 2 illustrates an example of a hardware configuration of an information processing apparatus and a terminal device according to an embodiment of the present invention.

FIG. 2 is a diagram illustrating an example of a hardware configuration of the information processing apparatus 2 and the terminal device 3 according to an embodiment of the present invention. As illustrated in FIG. 2, the information processing apparatus 2 and the terminal device 3 are constructed by a computer and include a central processing unit (CPU) 501, a read-only memory (ROM) 502, a random access memory (RAM) 503, a Hard Disk (HD) 504, a Hard Disk Drive (HDD) controller 505, a display 506, an external device connection Interface (I/F) 508, a network I/F 509, a bus line 510, a keyboard 511, a pointing device 512, a Digital Versatile Disk Rewritable (DVD-RW) drive 514, a medium I/F 516, a microphone 517, a speaker 518, and a sound input/output I/F 519.

Among these, the CPU 501 controls the operation of the entire information processing apparatus 2 and the terminal device 3. The ROM 502 stores a program used for driving the CPU 501 such as the initial program loader (IPL). The RAM 503 is used as a work area of the CPU 501. The HD 504 stores various kinds of data such as programs. The HDD controller 505 controls the reading or writing of various kinds of data from or to the HD 504 according to the control by the CPU 501. The display 506 displays various kinds of information such as cursors, menus, windows, characters, or images. The external device connection I/F 508 is an interface for connecting various external devices. The external device in this case is, for example, a Universal Serial Bus (USB) memory or a printer. The network I/F 509 is an interface for data communication by using the communication network 5. The bus line 510 is an address bus, data bus, or the like for electrically connecting each element such as the CPU 501 illustrated in FIG. 2.

The keyboard 511 is a type of input means having a plurality of keys used for inputting characters, numbers, or various instructions. The pointing device 512 is a type of input means for selecting and executing various instructions, selecting a processing object, moving a cursor, or the like. The DVD-RW drive 514 controls the reading or writing of various kinds of data from or to the DVD-RW 513 that is an example of a removable recording medium. The DVD-RW drive 514 is not limited to be for a DVD-RW but may be for a Digital Versatile Disc Recordable (DVD-R), or the like. The medium I/F 516 controls the reading or writing (storage) of data from or to a recording medium 515 such as a flash memory.

The microphone 517 is a built-in circuit that converts sound into an electrical signal. The speaker 518 is a built-in circuit that converts an electrical signal into a physical vibration to produce sound such as music or voice. The sound input/output I/F 519 is a circuit that processes the input/output of sound signals between the microphone 517 and the speaker 518 under the control of the CPU 501.

<About Functions>

Figure 3:
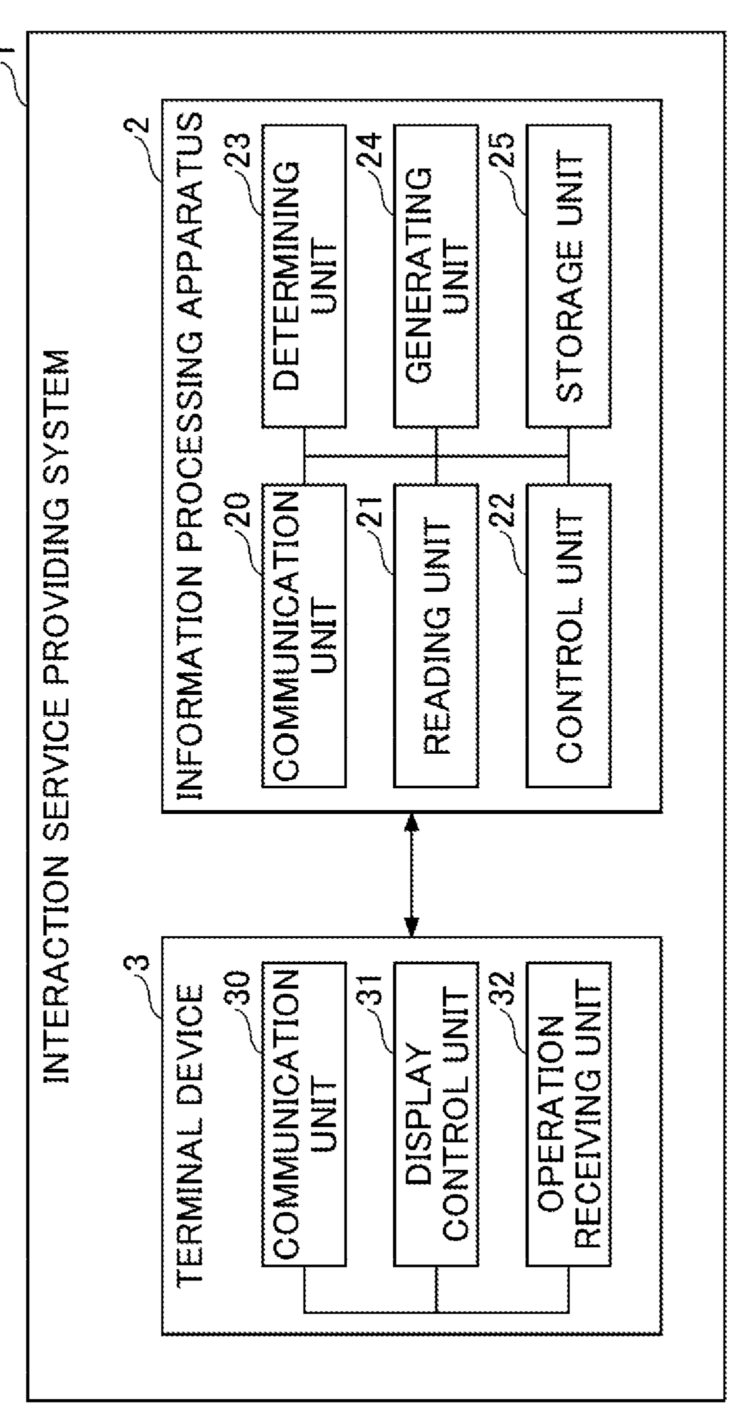
FIG. 3 illustrates an example of a configuration of functional blocks in an interaction service providing system according to an embodiment of the present invention.

FIG. 3 is a diagram illustrating an example of a configuration diagram of functional blocks in the interaction service providing system 1 according to an embodiment of the present invention. The information processing apparatus 2 includes a communication unit 20, a reading unit 21, a control unit 22, a determining unit 23, and a generating unit 24. These units are functions or means implemented by the CPU 501 executing instructions included in one or more programs installed in the information processing apparatus 2. The information processing apparatus 2 further includes a storage unit 25 which can be implemented by, for example, a storage device such as the HD 504 included in the information processing apparatus 2.

The communication unit 20 is a communication function of the information processing apparatus 2 and transmits and receives information to and from the terminal device 3 and the external database 4 via the communication network 5.

The reading unit 21 reads the user information and the history information of the interaction stored in the storage unit 25 of the information processing apparatus 2 or the external database 4 at the start of the interaction service.

The control unit 22 determines whether the user information of the user who started the interaction is insufficient based on the user information. The control unit 22 controls the transition of the processing in the interaction service.

The determining unit 23 determines the characteristics of the user. For example, the determining unit 23 determines the user group indicating the characteristics of the user for which the user information is insufficient, based on the information input by the user and the interaction history. Details of the determination method will be described later.

The generating unit 24 generates speech information (message) according to the characteristics of the user, for example, based on the user information, the interaction history, and the user group of a new user determined by the determining unit 23. Details of the generation method will be described later.

The storage unit 25 stores user information used in the interaction service and history information of the interaction. Details of the user information and history information will be described later.

The terminal device 3 includes a communication unit 30, a display control unit 31, and an operation receiving unit 32. These units are functions or means implemented by the CPU 501 executing instructions included in one or more programs installed in the terminal device 3.

The communication unit 30 is a communication function of the terminal device 3 and transmits and receives information to and from the information processing apparatus 2 or the like via the communication network 5.

The display control unit 31 uses the information received by the communication unit 30 to display, on the display of the terminal device 3, a screen of the interaction service, speech information, or the like.

The operation receiving unit 32 receives operations such as inputting characters and pressing buttons by the user through the keyboard and the pointing device of the terminal device 3. The operation receiving unit 32 receives voice input by the user through the microphone 517 of the terminal device 3.

<Interaction Processing According to User Characteristics>

Figure 4:
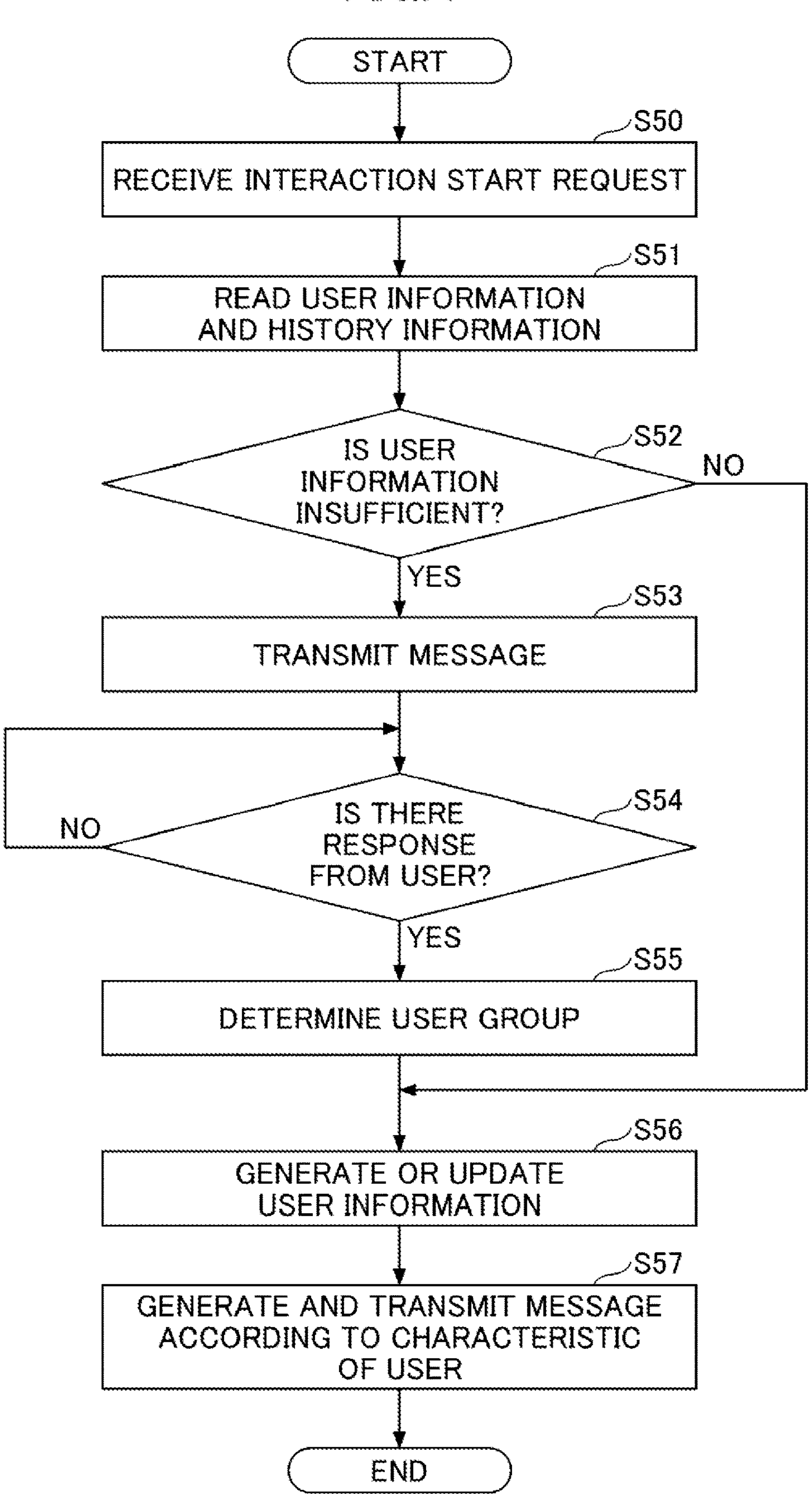
FIG. 4 is a diagram illustrating an example of a flowchart of interaction processing according to a characteristic of a user according to an embodiment of the present invention.

FIG. 4 is a diagram illustrating an example of a flowchart of interaction processing according to user characteristics according to an embodiment of the present invention. In this flowchart, an outline of interaction processing according to user characteristics executed in the interaction service providing system 1 will be described. The processing of each step in FIG. 4 will be described below.

Step S50: The operation receiving unit 32 of the terminal device 3 receives an operation to start the use of the interaction service by the user. The communication unit 30 of the terminal device 3 transmits a request to start the use of the interaction service to the communication unit 20 of the information processing apparatus 2.

Step S51: The reading unit 21 of the information processing apparatus 2 reads user information and history information of the interaction stored in the storage unit 25 of the information processing apparatus 2. Alternatively, all or part of the user information and history information is stored in the external database 4, and the reading unit 21 may read all or part of the user information and history information stored in the external database 4 as necessary. FIG. 5 is a diagram illustrating an example of user information according to an embodiment of the present invention. User information 100 of FIG. 5 includes items of a user identifier 101, a user name 102, and a user group 103.

The user identifier 101 is an identifier for identifying a user who uses the interaction service, and three digits are used here.

The user name 102 is the user name of the user identified by the user identifier 101, and for example, the user name 102 is displayed on the screen of the interaction or included in the speech information in the interaction.

The user group 103 is a group assigned to the user according to the characteristics of the user, and, for example, an integer of 1 or more is assigned to each group.

Referring back to FIG. 4, the description will continue.

Step S52: The control unit 22 of the information processing apparatus 2 determines, based on the user information, whether the user information of the user requesting the start of use of interaction service is insufficient. A case in which the user information is insufficient is, for example, a case in which the interaction service is used for the first time and the information of the user group is not input. Even if it is not the first time to use the interaction service, a case in which the information of the user group, which is for determining the message to be transmitted to the user, is not provided, also corresponds to a case in which the user information is insufficient. On the other hand, a case in which the user information is not insufficient corresponds to a case in which this interaction service has been used in the past and the user group has already been determined. Further, even if it is the first time to use the interaction service, if the user group has already been determined, this corresponds to a case in which the user information is not insufficient. For example, there is a case in which the user group information has already been input, by taking a step of inputting the attribute information before use. Further, the control unit 22 of the information processing apparatus 2 causes the processing to transition to step S53 when the user is determined to be a new user, and causes the processing to transition to step S56 when the user is determined to be an existing user.

Step S53: The generating unit 24 of the information processing apparatus 2 generates a message for determining the user group. The message may be, for example, predetermined greetings. The communication unit 20 of the information processing apparatus 2 transmits the message generated by the generating unit 24 to the communication unit 30 of the terminal device 3.

Step S54: If the communication unit 20 of the information processing apparatus 2 receives, from the user, a response message in response to the message transmitted in step S53 (there is a response from user), the control unit 22 of the information processing apparatus 2 causes the processing to transition to step S55. The control unit 22 continues the processing of this step until the communication unit 20 of the information processing apparatus 2 receives the response message from the user.

Step S55: The determining unit 23 of the information processing apparatus 2 determines the user group based on the user information and history information read by the reading unit 21 in step S51 and the response message from the user received by the communication unit 20 in step S54. Details of the determination method will be described later.

Step S56: The storage unit 25 of the information processing apparatus 2 generates or creates user information and stores the user information when the processing has transitioned from step S55. The storage unit 25 updates and stores the user information when the processing has transitioned from step S52. For example, when the processing has transitioned from step S55, the user information is such that the user identifier 101 in the user information 100 of FIG. 5 corresponds to "003", the user name 102 is "new user", and the user group 103 is "2".

Step S57: The generating unit 24 of the information processing apparatus 2 generates a message according to the characteristics of the user in the interaction service based on the response message input by the user, user information, and interaction history. Details of the generation method will be described later. The communication unit 20 of the information processing apparatus 2 transmits the generated message to the communication unit 30 of the terminal device 3. The display control unit 31 of the terminal device 3 displays the message received by the communication unit 30 on the display of the terminal device 3.

By the above processing, the interaction service providing system 1 can provide an interaction service according to the characteristics of the user without forcing the input of attribute information indicating the characteristics of the user. Further, even when the input of attribute information by the user is insufficient, the interaction service according to the characteristics of the user can be provided.

<User Group Determination Processing>

Figure 6:
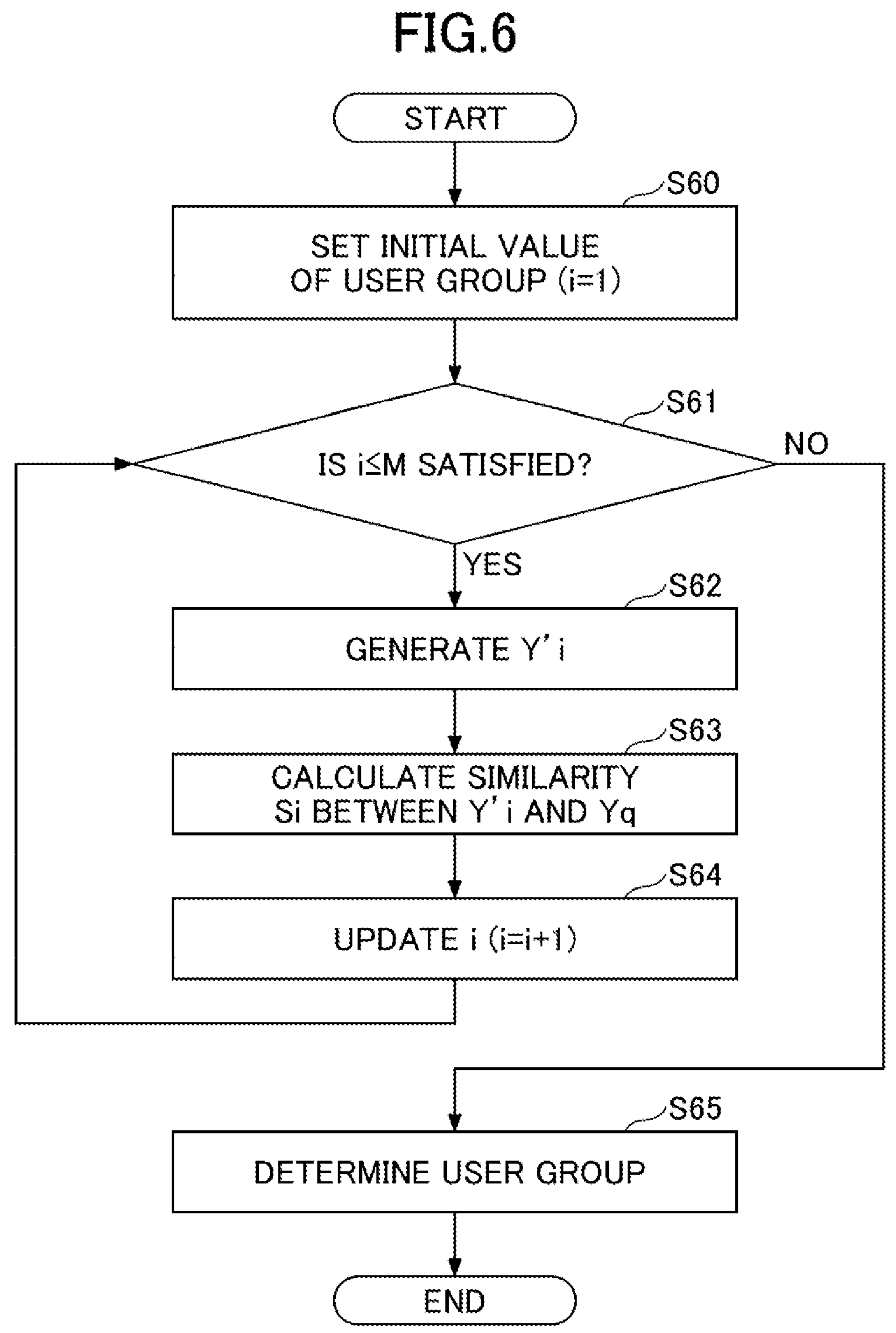
FIG. 6 is a diagram illustrating an example of a flowchart of user group determination processing according to an embodiment of the present invention.

FIG. 6 is a diagram illustrating an example of a flowchart of user group determination processing according to an embodiment of the present invention. In this flowchart, details of the processing of determining the user group of the new user in step S55 of FIG. 4 will be described. The processing of each step of FIG. 6 will be described below.

Step S60: The control unit 22 of the information processing apparatus 2 sets the value of a variable i indicating the user group to 1, which is the initial value. It is assumed that, as user groups, there are M types of user groups indicated by an integer from 1 to M.

Step S61: If the value of the variable i is less than or equal to M, the control unit 22 of the information processing apparatus 2 causes the processing to transition to step S62, and if not, causes the processing to transition to step S65.

Step S62: In the situation of step S54 in FIG. 4, the determining unit 23 of the information processing apparatus 2 estimates a message that will be input as a response by a user whose user group is i, and generates the estimated message (Y' i). Here, "'" of "Y' I" indicates that the message is an estimated message, and "i" is a value indicating the user group. For example, it is assumed that a message (Yx) transmitted from the information processing apparatus 2 to the terminal device 3 in step S53 of FIG. 4 is "Thank you for your hard work. Is there anything I can help you with?" and a message (Yq) input by the new user in response to the message Yx in step S54 of FIG. 4 is "It is busy here at the company today. I want to do A." Here, the determining unit 23 generates "I want to do A." as the a message (Y' 1) estimated as a response that will be input by the user whose user group is 1 (i=1), for example.

Figure 7A:
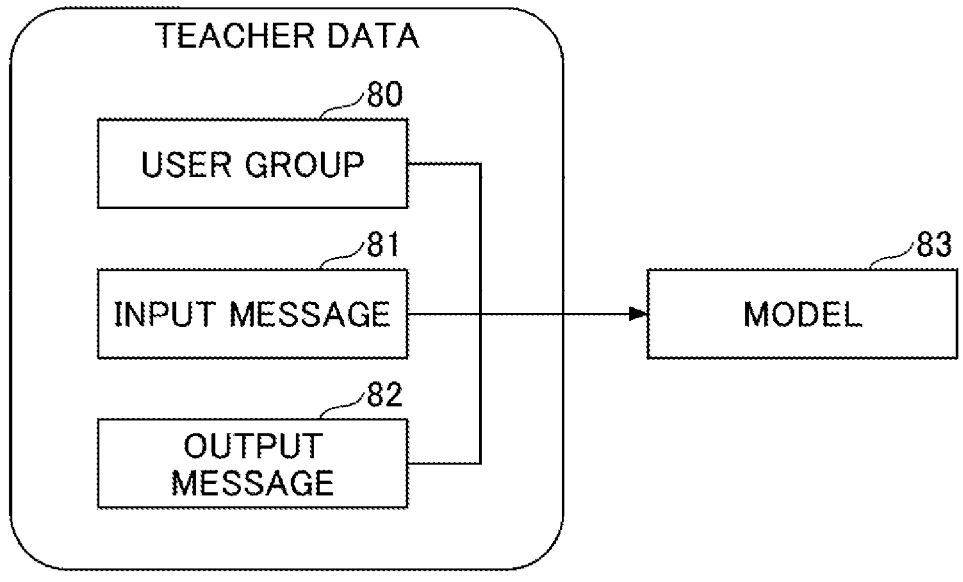
FIGS. 7A and 7B are diagrams for explaining message generation processing by using a machine learning model according to an embodiment of the present invention.
Figure 7B:
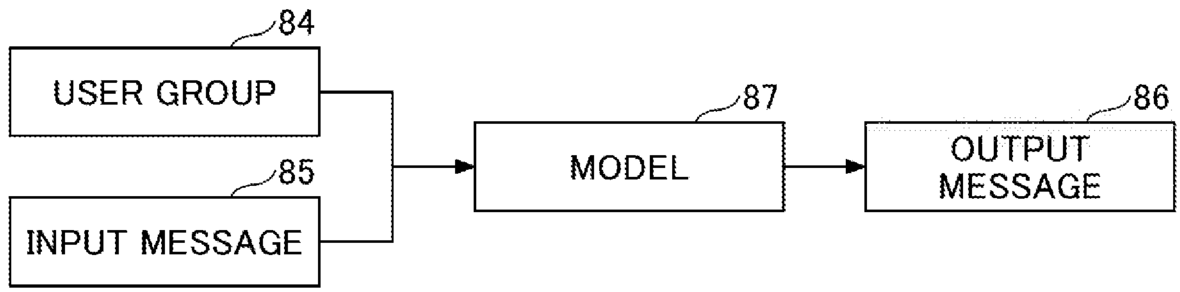

As a method for estimating the message, it is possible to use, for example, a machine learning model referred to as an encoder-decoder model used in the field of machine translation, which outputs a desired natural sentence based on the input natural sentence. FIGS. 7A and 7B are diagrams for explaining a message generation processing using a machine learning model according to an embodiment of the present invention. First, as illustrated in FIG. 7A, learning of the model is performed by inputting, as teacher data, teacher data including a user group 80, an input message 81, and an output message 82 as one set to a model 83 for generating a message. Here, the input message 81 is a message (Yx) transmitted from the aforementioned information processing apparatus 2 to the terminal device 3. The output message 82 is a response by the user of the user group 80 in response to the message Yx, included in the interaction history. After the model learning is completed, as illustrated in FIG. 7B, a user group 84 and an input message 85 can be input to the learned model 87 to obtain an output message 86. The input message 85 is a message (Yx) transmitted from the information processing apparatus 2 to the terminal device 3, and the output message 86 is a message (Y' i) estimated as a response by the user of the user group 84 in response to the message Yx. In this way, the message (Y' i) is generated by using a learning model that is learned by using the user group of another user who already has the information of the user group, and the history information of the existing user. That is, the message (Y' i) is generated based on the user information and the history information.

Alternatively, in FIG. 7A, as the teacher data, the model 83 may be learned by using the input message 81 as a response message (Y) by a user of any user group, and using the output message 82 as a response by a user of a user group (i) of the user group 80 corresponding to Y. After the learning of the model is completed, as illustrated in FIG. 7B, the user group 84 and the input message 85 may be input to the learned model 87 to obtain the output message 86. Here, the input message 85 is a response message (Yq) input in response to the message Yx by a user whose user group information is insufficient. The output message 86 is a message (Y' i) estimated by processing the message Yq as a response by a user of the user group (i). Thus, the message (Y' i) is generated by processing input information input by a new user, by using a learning model learned by using user information and history information of another user who already has information of a user group. That is, the message (Y' i) is generated by processing input information input by a user whose user group information is insufficient based on the user information and history information. Referring back to FIG. 6, the description will continue.

Step S63: The determining unit 23 of the information processing apparatus 2 calculates the similarity Si between the message (Y' i) estimated as the response by the user of the user group (i) in step S62 and the message (Yq) input as the response by the user whose user group information is insufficient. For example, the determining unit 23 calculates, as the similarity Si, the ROUGE value for evaluating the matching degree between two texts generally used in the field of language processing. The closer the ROUGE value is to 1, the more similar the two texts are, and the closer the ROUGE value is to 0, the less similar the two texts are. In this case, the similarity Si means that the higher the value, the higher the similarity.

Step S64: The control unit 22 of the information processing apparatus 2 updates the value of the variable i by adding 1 to the value of the variable i indicating the user group.

Step S65: Among all the user groups for which the similarities Si have been calculated, the determining unit 23 of the information processing apparatus 2 determines the user group with the highest similarity as the user group of the user whose user group information is insufficient. For example, if the ROUGE value described in step S63 is calculated as the similarity Si, the determining unit 23 determines the user group with the highest Si value as the user group of the new user. Specifically, for example, if the user group (i) is of two types 1 and 2, i.e., i={1, 2}, and the calculated similarity is Si={0.3, 0.6}, the determining unit 23 determines that the user group of the new user is 2.

By the above processing, in the interaction service providing system 1, it is possible for a user whose user group information is insufficient to determine the user group, which is information indicating the characteristics of the user, based on the information input as a response in the interaction.

Alternatively, in the interaction service providing system 1, as a message (Yq) used in steps S62 and S63 of FIG. 6, a natural sentence input for the purpose of a report or the like by a user whose user group information is insufficient, may be used. The message (Y' i) is estimated as a natural sentence input by a user of the user group (i), by using the machine learning model illustrated in FIG. 7. The machine learning model is learned to estimate a natural sentence input by a user of the user group (i).

<Example of Interaction Processing>

Figure 8:
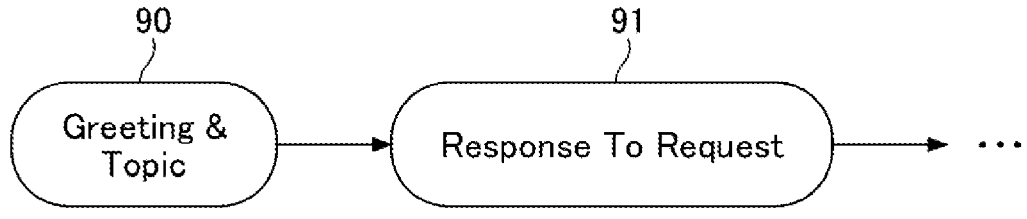
FIG. 8 is a diagram illustrating an example of a flow of interaction according to an embodiment of the present invention.

FIG. 8 is a diagram illustrating an example of a flow of interaction processing according to an embodiment of the present invention. In the interaction service providing system 1, for example, when the information processing apparatus 2 receives a request to start the interaction service from the terminal device 3 operated by the user, the information processing apparatus 2 transmits a message 90 related to "Greeting & Topic" to the terminal device 3. "Greeting & Topic" is a message related to a request to present a greeting and a topic. Next, when the information processing apparatus 2 receives the next message from the terminal device 3, the information processing apparatus 2 transmits a message 91 related to "Response To Request" to the terminal device 3. "Response To Request" is a message related to a response to a request from a user.

FIGS. 9A and 9B are diagrams for explaining message generation processing according to the characteristics of a user according to an embodiment of the present invention. The template 92 of FIG. 9A is a template (also referred to as a model) for generating the message 90 of FIG. 8. The user name of the user to be interacted with is inserted in <UserName>. In the case of a new user, for example, the user name is "new user", and in the case of an existing user, the user name 102 of the corresponding existing user in the user information 100 of FIG. 5 is used. A template 93 of FIG. 9B is a template for generating the message 91 of FIG. 8. The template 93 generates different messages depending on the user group of the user. For example, when the user group is "1", the message of "You would like to do <Select>. Certainly." is selected first, and when the user group is "2", the message of "<iceBreak>. You would like to do <Select>. Certainly." is selected. Further, <Select> is processed by inserting the content of the topic included in the response of the user to the message 90 of FIG. 8. Further, the <iceBreak> is processed by inserting, for example, predetermined wordings for reducing tension. Thus, in the interaction service providing system 1, it is possible to generate a message corresponding to a user group, which is information indicating characteristics of a user (new user and existing user), and display the message on the terminal device 3 operated by the user. In this way, the generating unit 24 of the information processing apparatus 2 can generate speech information (message) to be presented to the user by selecting and processing a predetermined template based on the user group indicating characteristics of the new user determined by the determining unit 23 of the information processing apparatus 2.

Figure 10A:
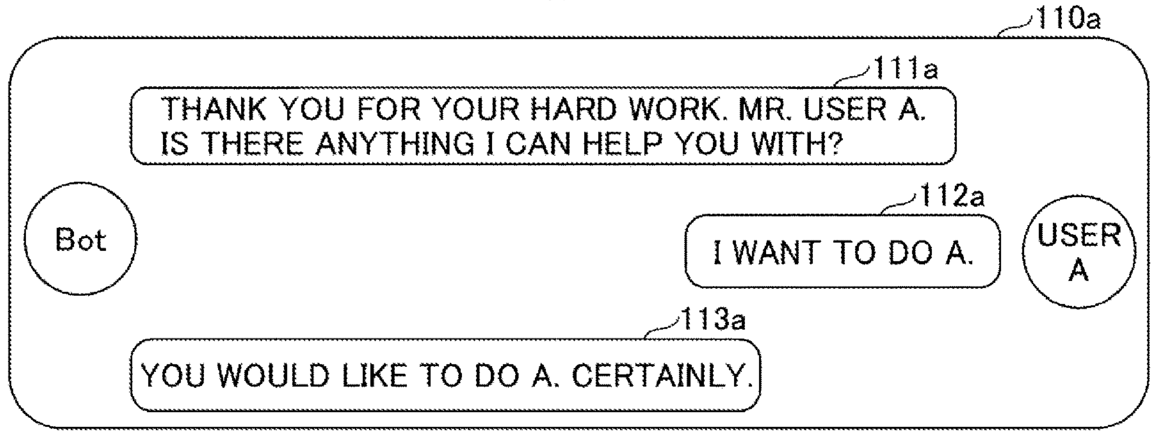
FIGS. 10A to 10C are diagrams illustrating an example of an interaction screen displayed on a terminal device according to an embodiment of the present invention.
Figure 10B:
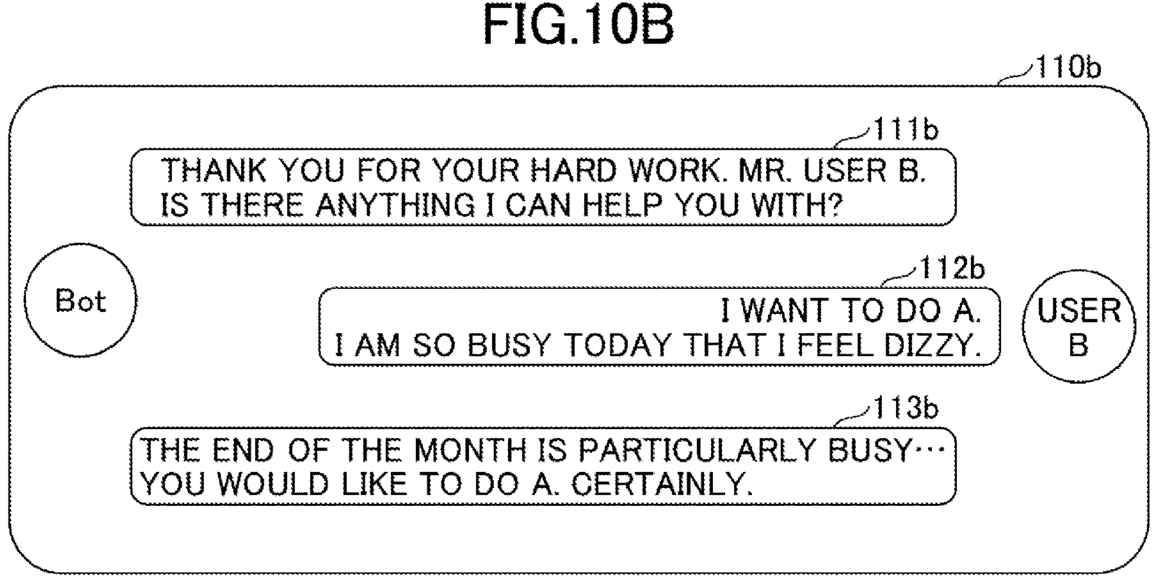
Figure 10C:
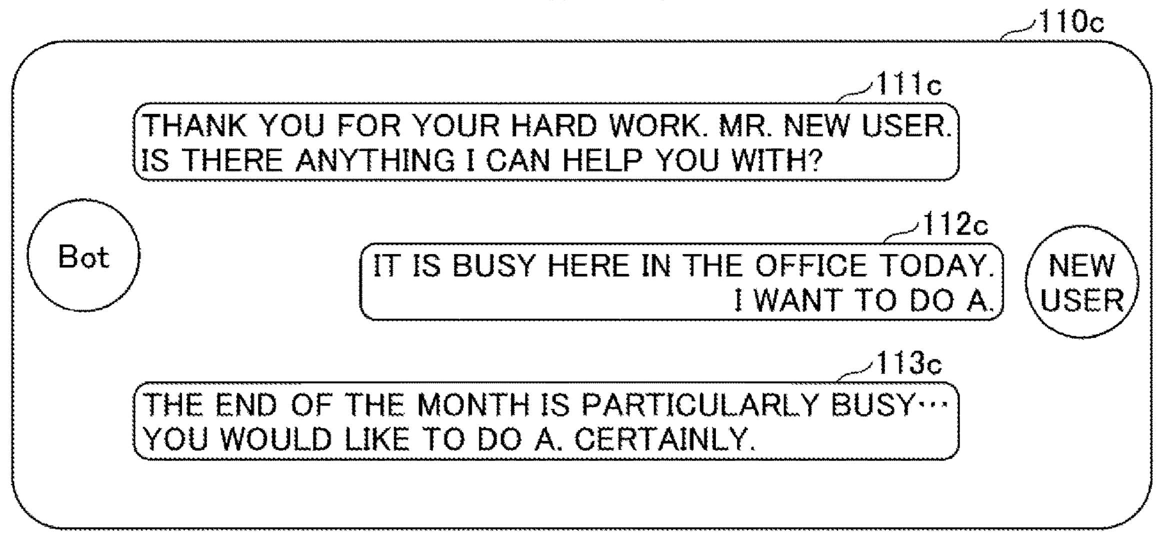

FIGS. 10A to 10C are diagrams illustrating examples of interaction screens displayed on a terminal device according to an embodiment of the present invention. Interaction screens 110*a*, 110*b*, and 110*c* in FIGS. 10A to 10C are interaction screens displayed on a screen of the terminal device 3 operated by a user A, a user B, and a new user, respectively. Messages 111*a*, 111*b*, and 111*c* are messages transmitted to a user A, a user B, and a new user, respectively, corresponding to the message 90 in FIG. 8. Messages 112*a*, 112*b*, and 112*c* are messages in which the user A, the user B, and the new user input a response to the message 90 in FIG. 8, respectively. Messages 113*a*, 113*b*, and 113*c* are messages transmitted to the user A, the user B, and the new user, respectively, corresponding to the message 91 in FIG. 8. Here, the interaction service providing system 1 determines the user group of the user whose user group information is insufficient based on the interaction processing described in FIG. 4, etc., and transmits a message corresponding to the determined user group to the terminal device 3 of the user whose user group information is insufficient. Specifically, the determining unit 23 of the information processing apparatus 2 determines that the user group of the user whose user group information is insufficient, is the same as the user group of the user B based on the message 112*c* input by the user whose user group information is insufficient. The generating unit 24 of the information processing apparatus 2 generates a message 113*c* corresponding to the message 91 of FIG. 8 according to the determined user group. That is, the user group of the user whose user group information is insufficient is determined to be the same user group as that of the user B, and, therefore, the generated message 113*c* is the same message as the message 112*c* for the user B. The method of generating the message is, for example, generating the message by using the template 93 as described in FIG. 9B. Alternatively, if the message 112*b* to the user B is included in the interaction history, the message 112*c* may be generated by making the same content as the message 112*b*, which is a message to a user of the same user group.

<User Group Determination Processing (Modified Example 1)>

As a modified example 1, the user group determination processing which is different from the method described in the flowchart of FIG. 6 will be described, mainly regarding the different points. FIG. 11 is a diagram illustrating an example of a flowchart of the user group determination processing (modified example 1) according to an embodiment of the present invention. The determination method in the modified example 1 does not generate a message estimating a response message by the user, which is performed in step S62 of FIG. 6. In the calculation of the similarity Si in step S63 of FIG. 6, the estimated message (Y' i) is not used, but the message (Yi) previously input by the user of the user group (i) stored in the interaction history is used. That is, the following step is executed instead of step S63 of FIG. 6.

Step S'63: The determining unit 23 of the information processing apparatus 2 calculates the similarity Si between a message (Yi) previously input as a response by a user of the user group (i) and a message (Yq) input as a response by a new user. FIG. 12 is a diagram illustrating an example of interaction history according to an embodiment of the present invention. Interaction history 120 of FIG. 12 includes items of a history identifier 121, a transmitted message 122, a response message 123, and a user identifier 124.

The history identifier 121 is an identifier for identifying a message in the interaction history.

The transmitted message 122 is a message transmitted by the information processing apparatus 2 to the terminal device 3. Here, the content of the transmitted message is described after information such as "Greeting & Topic" so that it is possible to identify which message the transmitted message corresponds to in the flow of the interaction illustrated in FIG. 8.

The response message 123 is a message input by the user as a response to the transmitted message 122 and corresponds to the message (Yi) used in step S'63 of FIG. 11.

The user identifier 124 is an identifier for identifying the user who input the response message 123. Further, by referring to the user information 100 in FIG. 5, the user group of the user who input the response message 123 can be specified. The item of the interaction history 120 in FIG. 12 is an example, and may include, for example, an item indicating the user group.

Here, a plurality of users may correspond to one user group, and, therefore, the number of messages (Yi) in a user group may be a plurality. The determining unit 23 may calculate the average, median, maximum, and minimum values of Si calculated for the plurality of messages (Yi) in a user group, as the final Si.

Alternatively, the message (Yq) used in step S'63 of FIG. 11 may be a natural sentence input for the purpose of, for example, a report, by a user whose user group information is insufficient. The message (Yi) may be a natural sentence input by a user of the user group (i).

<Message Generation Method (Modified Example 2)>

As a modified example 2, message generation processing different from the method described in FIG. 9 will be described with respect to the message generation in step S57 of FIG. 4 according to the embodiment. FIG. 13 is a flowchart illustrating message generation processing (modified example 2) according to an embodiment of the present invention. In the modified example 2, first, the user corresponding to the response message in the interaction history, having the highest similarity with the response message of the user whose user group information is insufficient, is determined. Next, the message transmitted to the determined user subsequently after the determined response message, is generated as the message to be transmitted to the user whose user group information is insufficient. The processing of each step in FIG. 13 will be described below.

Step S70: The control unit 22 of the information processing apparatus 2 sets the value of the variable j indicating the user identifier to 1, which is the initial value. Here, it is assumed that N types of user identifiers are set, indicated by integers from 1 to N.

Step S71: If the value of the variable j is less than or equal to N, the control unit 22 of the information processing apparatus 2 causes the processing to transition to step S72, and otherwise, causes the processing to transition to step S74.

Step S72: The determining unit 23 of the information processing apparatus 2 calculates the similarity Sj between the response message (Yq) of the user whose user group information is insufficient and the response message (Yj) corresponding to the message Yq input in the past by the user whose user identifier is j. Alternatively, similar to the method illustrated in step S62 of FIG. 6, the determining unit 23 may calculate the similarity Sj by using a message (Y' i) obtained by estimating the response of the user whose user identifier is j by using a machine learning model. At this time, the identifier of the user is used instead of the user group as input to the model in the model learning and estimation using the model. The method for calculating the similarity Sj is the same as the method for calculating the similarity Si described in step S63 of FIG. 6.

Step S73: The control unit 22 of the information processing apparatus 2 updates the value of the variable j by adding 1 to the value of the variable j indicating the user identifier.

Step S74: The determining unit 23 of the information processing apparatus 2 determines the response message (Yj) with the highest similarity among the similarities Sj calculated for the response messages (Yj) of all users, and the user (value of the user identifier) corresponding to the message Yj. Here, the determined user becomes the existing user with the highest similarity with the new user. The generating unit 24 of the information processing apparatus 2 generates the message transmitted to the determined user subsequently after the determined response message, as a message to be transmitted to the new user. For example, in the interaction history 120 of FIG. 12, if the response message (Yj) determined by the determining unit 23 is the response message 123 whose history identifier 121 is "002", the corresponding user becomes the user whose user identifier 124 is "002". The generating unit 24 generates the same message as the transmitted message 122 whose history identifier 121 is "004", which is the message transmitted to the user whose user identifier 124 is "002", as a message to be transmitted to the user whose user group information is insufficient.

By the above processing, the interaction service providing system 1 can determine the existing user having the highest similarity with the user whose user group information is insufficient as a characteristic of the user whose user group information is insufficient, based on the speech information input by the user whose user group information is insufficient and the interaction history of the existing user. Further, the interaction service providing system 1 can generate a message corresponding to the characteristic of the user whose user group information is insufficient, for presenting the message to the user whose user group information is insufficient, based on the characteristic of the determined new user.

<Message Generation Method (Modified Example 3)>

In the modified example 2, user information including information about a user group is not used. Therefore, as the modified example 3, for example, when it is difficult to determine the user group of a user whose user group information is insufficient, the generating unit 24 of the information processing apparatus 2 may generate a message by the method illustrated in the modified example 2. As for the determination of whether it is difficult to determine the user group, the determining unit 23 of the information processing apparatus 2 determines that it is difficult, for example, when the maximum value of the similarity Si calculated in step S63 of FIG. 6 is smaller than a predetermined threshold value, or when the difference between the maximum value of the similarity and the next largest value is smaller than a predetermined threshold value.

<Message Generation Method (Modified Example 4)>

It is also conceivable that the contents of messages input by users may vary widely depending on the contents of messages, even for users in the same user group. In such a case, it is considered effective to generate a message to respond to a user whose user group information is insufficient, based on the history information of an existing user with the highest similarity with the user with insufficient user group information, without considering the user group. Accordingly, the generating unit 24 of the information processing apparatus 2 may generate a message by using the method illustrated in the modified example 2 in accordance with the contents of the messages in the interaction flow illustrated in FIG. 8. For example, the generating unit 24 may generate messages by the method illustrated in the modified example 2 for predetermined messages in the interaction flow. Alternatively, the generating unit 24 may generate messages by the method illustrated in the modified example 2 when the maximum value of similarity Sj calculated in step S72 of FIG. 13 is larger than a predetermined threshold value or when the difference between the maximum value of similarity and the next largest value is larger than a predetermined threshold value.

<Another Example of the Display Screen of the Terminal Device 3>

Figure 14:
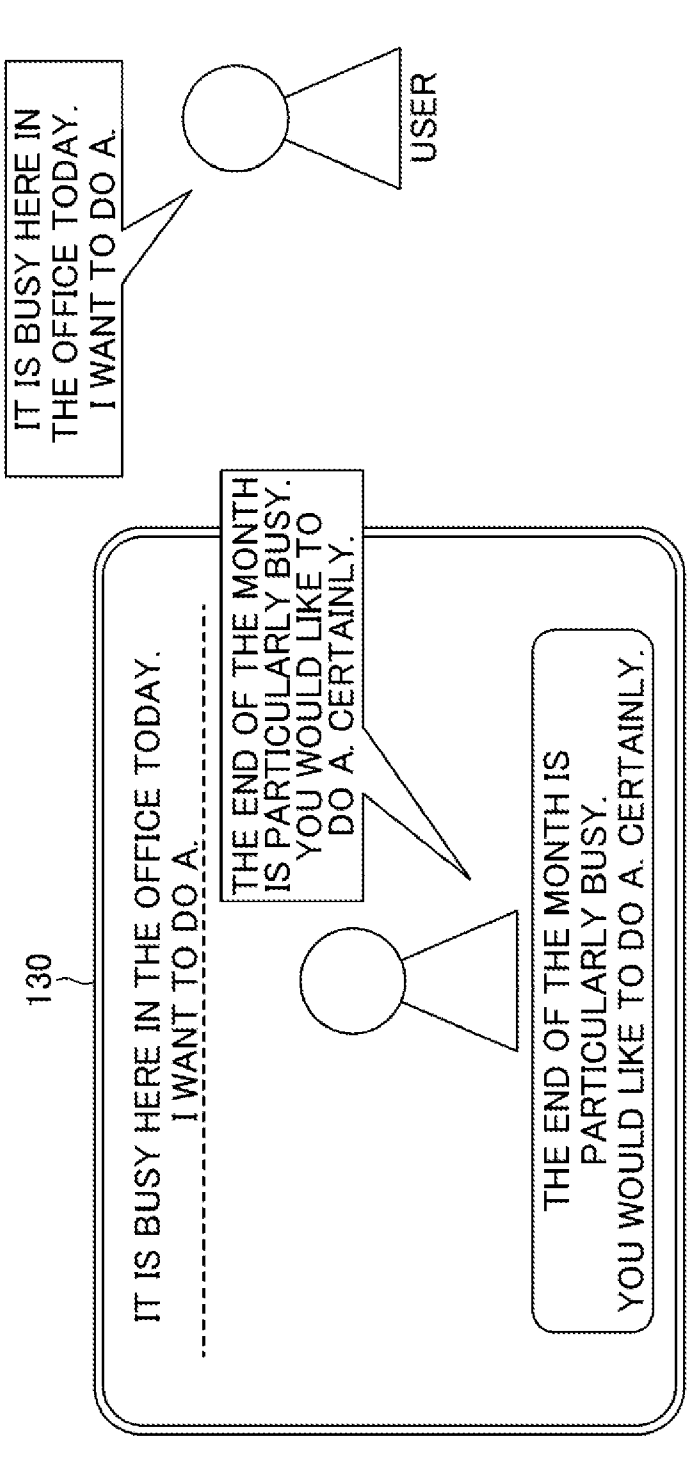
FIG. 14 illustrates another example of an interaction screen displayed on a terminal device according to an embodiment of the present invention.

FIG. 14 illustrates another example of the interaction screen displayed on the terminal device according to the embodiment of the present invention. In the interaction screen 130 of FIG. 14, a person (virtual assistant) is displayed in the center of the screen, a message input by the user is displayed on the upper side of the screen, and a message to be presented to the user is displayed on the lower side of the screen. Further, the user can input a message to the terminal device 3 using voice, and the contents of the message to be presented to the user can be output from the speaker of the terminal device 3. In this way, a user interface of the form in which the user converses with the virtual assistant through the interaction screen 130 may be used. A user interface of the form in which a 3D virtual space or a metaverse in which the user himself is displayed on the screen as an avatar may be used.

Although several embodiments for implementing the present invention have been described above, the interaction service providing system, the information processing apparatus, the interaction service providing method, and the recording medium are not limited to the specific embodiments described in the detailed description, and variations and modifications may be made without departing from the scope of the present invention.

Furthermore, the configuration example of the functional blocks of FIG. 3, etc., indicated in the above embodiment is divided according to the main functions to facilitate the understanding of processes by the information processing apparatus 2 configuring the interaction service providing system 1. The present invention is not limited by how the process units are divided or the names of the process units. The processes of the interaction service providing system 1 and the information processing apparatus 2 may be further divided into many process units according to the process contents. Furthermore, the process units may be divided such that a single process unit further includes many processes.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC), a digital signal processor (DSP), a field programmable gate array (FPGA), and a conventional circuit module, designed to execute each function as described above.

Also, the apparatus group described in the examples is merely indicative of one of a plurality of computing environments for carrying out the embodiments disclosed herein. In some embodiments, the interaction service providing system 1 and the information processing apparatus 2 include a plurality of computing devices, such as server clusters. The plurality of computing devices are configured to communicate with each other via any type of communication link, including networks, a shared memory, and the like, and perform the processes disclosed herein.

According to an embodiment of the present invention, it is possible to provide an interaction service according to the characteristics of a user without requiring the user to input attribute information indicating the characteristics of the user. It is also possible to provide an interaction service according to the characteristics of a new user without requiring the new user to input attribute information indicating the characteristics of the user.

What is claimed is:

1. An interaction service providing system comprising:

a terminal device operated by a user; and an information processing apparatus configured to communicate with the terminal device, wherein the information processing apparatus includes:

first circuitry; and a first memory storing computer-executable instructions that cause the first circuitry to execute:

communicating with the terminal device to receive, from the terminal device, input information that is input by the user;

determining whether the user who entered the input information is a new user or an existing user;

in the case where the determining determines that the user is a new user, generating predetermined speech information;

in the case where the determining determines that the user is an existing user, reading history information of the existing user;

determining a characteristic of the user based on the input information and the history information; and generating first speech information or second speech information to be presented to the user, based on the characteristic of the user, wherein in the case of the new user, transmitting the generated first speech information to the terminal device, and in the case of the existing user, transmitting the generated second speech information to the terminal device, and the first memory storing computer-executable instructions further cause the first circuitry to execute:

identifying a plurality of user groups;

for each of the plurality of user groups identified, generating message information estimating a message input as a response by a user belonging to the user group among the plurality of user groups based on user information and the history information of the user;

determining a similarity between the input information and the message information of each of the plurality of user groups; and determining user characteristics by determining a user group among the plurality of user groups having a highest similarity among the plurality of user groups based on the determined similarity, and generating the message information to be presented to the user based on the determined user characteristics; and the terminal device includes:

second circuitry; and a second memory storing computer-executable instructions that cause the first circuitry to execute:

displaying the speech information received from the information processing apparatus.

2. The interaction service providing system according to claim 1, wherein the reading includes reading the user information including a user group of the existing user among the plurality of user groups, and the determining includes determining a user group of the user, as the characteristic of the user, based on the input information, the history information, and the user information.

3. The interaction service providing system according to claim 1, wherein the reading includes reading the user information including a user group of the existing user among the plurality of user groups, and the determining includes determining the existing user that is most similar to the user, as the characteristic of the user, based on the input information, the history information, and the user information.

4. The interaction service providing system according to claim 2, wherein the determining includes determining the user group of the user, based on a similarity between the input information and the speech information corresponding to the existing user included in the history information.

5. The interaction service providing system according to claim 4, wherein the determining includes determining, as the user group of the user, the user group of the existing user corresponding to the speech information for which the similarity is a maximum value.

6. The interaction service providing system according to claim 2, wherein the determining includes determining the user group of the user, based on a similarity between the input information and the speech information obtained by processing the input information based on the user information and the history information.

7. The interaction service providing system according to claim 2, wherein the determining includes determining the user group of the user, based on a similarity between the input information and the speech information generated based on the user information and the history information.

8. The interaction service providing system according to claim 6, wherein the determining includes determining, as the user group of the user, a user group corresponding to the speech information for which the similarity is a maximum value.

9. The interaction service providing system according to claim 2, wherein the input information includes a first natural sentence input by the user, the history information includes a second natural sentence input by the existing user, and the determining includes determining the user group of the user, based on a similarity between the first natural sentence and the second natural sentence.

10. The interaction service providing system according to claim 9, wherein the determining includes determining, as the user group of the user, the user group of the existing user corresponding to the second natural sentence for which the similarity is a maximum value.

11. The interaction service providing system according to claim 2, wherein the input information includes a first natural sentence input by the user, and the determining includes determining the user group of the user, based on a similarity between the first natural sentence and a third natural sentence obtained by processing the first natural sentence based on the user information and the history information.

12. The interaction service providing system according to claim 2, wherein the input information includes a first natural sentence input by the user, and the determining includes determining the user group of the user, based on a similarity between the first natural sentence and a third natural sentence generated based on the user information and the history information.

13. The interaction service providing system according to claim 11, wherein the determining includes determining, as the user group of the user, the user group of the existing user corresponding to the third natural sentence for which the similarity is a maximum value.

14. The interaction service providing system according to claim 1, wherein the generating includes generating the speech information to be presented to the user, by selecting and processing a predetermined template, based on the determined characteristic of the user.

15. The interaction service providing system according to claim 1, wherein the determining includes determining whether it is difficult to determine a user group of the user among the plurality of user groups, and the generating includes generating the speech information to be presented to the user, based on the history information of the existing user that is determined to be most similar to the user, in response to determining that it is difficult to determine the user group of the user.

16. The interaction service providing system according to claim 1, wherein the generating includes selecting whether to generate the speech information based on the history information of the existing user that is most similar to the user, or to generate the speech information based on a user group of the user among the plurality of user groups, according to content of the speech information to be presented to the user.

17. The interaction service providing system according to claim 1, wherein determining the characteristic of the user comprises:

identifying the plurality of user groups;

for each of the plurality of user groups identified, generating a message estimated as a response by a user belonging to that user group among the plurality of user groups;

calculating a similarity between each generated estimated message and the input information from the new user; and determining a user group among the plurality of user groups for the new user based on the calculated similarity.

18. An information processing apparatus configured to communicate with a terminal device operated by a user, the information processing apparatus comprising:

circuitry; and a memory storing computer-executable instructions that cause the circuitry to execute a method, the method including:

communicating with the terminal device to receive, from the terminal device, input information that is input by the user;

determining whether the user who entered the input information is a new user or an existing user;

in the case where the determining determines that the user is a new user, generating predetermined speech information;

in the case where the determining determines that the user is an existing user, reading history information of the existing user;

determining a characteristic of the user based on the input information and the history information; and generating first speech information or second speech information to be presented to the user, based on the characteristic of the user, wherein in the case of the new user, transmitting the generated first speech information to the terminal device, and in the case of the existing user, transmitting the generated second speech information to the terminal device, the method further including:

identifying a plurality of user groups;

for each of the plurality of user groups identified, generating message information estimating a message input as a response by a user belonging to the user group among the plurality of user groups based on user information and the history information of the user;

determining a similarity between the input information and the message information of each of the plurality of user groups; and determining user characteristics by determining a user group among the plurality of user groups having a highest similarity among the plurality of user groups based on the determined similarity, and generating the message information to be presented to the user based on the determined user characteristics.

19. An interaction service providing method executed by an information processing apparatus configured to communicate with a terminal device operated by a user, the interaction service providing method comprising:

communicating with the terminal device to receive, from the terminal device, input information that is input by the user;

determining whether the user who entered the input information is a new user or an existing user;

in the case where the determining determines that the user is a new user, generating predetermined speech information;

in the case where the determining determines that the user is an existing user, reading history information of the existing user;

determining a characteristic of the user based on the input information and the history information; and generating first speech information or second speech information to be presented to the user, based on the characteristic of the user, wherein in the case of the new user, transmitting the generated first speech information to the terminal device, and in the case of the existing user, transmitting the generated second speech information to the terminal device, the interaction service providing method further including:

identifying a plurality of user groups;

for each of the plurality of user groups identified, generating message information estimating a message input as a response by a user belonging to the user group among the plurality of user groups based on user information and the history information of the user;

determining a similarity between the input information and the message information of each of the plurality of user groups; and determining user characteristics by determining a user group among the plurality of user groups having a highest similarity among the plurality of user groups based on the determined similarity, and generating the message information to be presented to the user based on the determined user characteristics.

20. A non-transitory computer-readable recording medium having computer-readable instructions stored thereon, which when executed, cause a computer including a memory and a processor to execute the method according to claim 18.

* * * * *